(12) United States Patent
Setchell et al.

(10) Patent No.: US 10,646,932 B2
(45) Date of Patent: May 12, 2020

(54) MORTISE JIG FOR A PLUNGE ROUTER

(71) Applicant: MORTISE PRO PLUS, LLC, Canyon Lake, TX (US)

(72) Inventors: Jay Setchell, Canyon Lake, TX (US); Larry Current, Canyon Lake, TX (US)

(*) Notice: Subject to any disclaimer, the term of this patent is extended or adjusted under 35 U.S.C. 154(b) by 682 days.

(21) Appl. No.: 14/945,235

(22) Filed: Nov. 18, 2015

(65) Prior Publication Data
US 2016/0136737 A1 May 19, 2016

Related U.S. Application Data

(60) Provisional application No. 62/081,653, filed on Nov. 19, 2014.

(51) Int. Cl.
*B23B 47/28* (2006.01)
*B27F 1/08* (2006.01)
*B23Q 9/00* (2006.01)

(52) U.S. Cl.
CPC .............. *B23B 47/288* (2013.01); *B23Q 9/00* (2013.01); *B27F 1/08* (2013.01); *B23B 2247/12* (2013.01)

(58) Field of Classification Search
CPC .... B27F 1/00; B27F 1/005; B27F 1/02; B27F 1/04; B27F 1/06; B27F 1/08; B27F 1/10; B27F 1/12; B27F 1/14; B27F 1/16; B27F 5/00; B27F 5/02
See application file for complete search history.

(56) References Cited

U.S. PATENT DOCUMENTS

| | | | | |
|---|---|---|---|---|
| 4,306,823 A | * | 12/1981 | Nashlund | B23B 47/287 144/144.52 |
| 4,630,657 A | * | 12/1986 | Obradovich | B23Q 9/0014 144/144.52 |
| 4,966,507 A | * | 10/1990 | Hanks | B23Q 9/0078 144/144.1 |
| 5,052,454 A | * | 10/1991 | Meinhardt | B23Q 9/0078 144/136.95 |
| 5,971,382 A | * | 10/1999 | Scheufler, Jr. | B23B 31/1071 269/47 |
| 6,112,783 A | * | 9/2000 | Newman | B23Q 9/0042 144/144.1 |
| 6,182,371 B1 | * | 2/2001 | Newman | B23Q 9/0042 144/144.1 |
| 2005/0236069 A1 | * | 10/2005 | O'Brien | B27C 5/10 144/144.1 |

* cited by examiner

*Primary Examiner* — Matthew Katcoff
(74) *Attorney, Agent, or Firm* — Nick Guinn; Gunn, Lee & Cave, P.C.

(57) ABSTRACT

A mortise and dowel hole jig for ensuring timely and consistent cuts with a plunge router. The jig mounts to a work table and includes slot(s) to confine the router bit while cutting horizontally and holding the router in place vertically by two router guides. The jig also includes a rear clamp to lock-in-place and serve as a face for one or more pieces of wood; front clamp(s) to secure each piece of wood while making cuts; and a centering tool that enables a woodworker to quickly line up the center point of the piece of wood and determine where to make the desired cut.

21 Claims, 6 Drawing Sheets

MORTISE JIG FOR A PLUNGE ROUTER

CROSS-REFERENCES TO RELATED APPLICATIONS

This application claims the benefit of and priority to U.S. Provisional Application Ser. No. 62/081,653, filed Nov. 19, 2014 and entitled Jig for a Plunge Router, which is incorporated by reference herein.

FEDERALLY SPONSORED RESEARCH OR DEVELOPMENT

Not applicable.

BACKGROUND OF THE INVENTION

1. Field of the Invention

The present invention relates generally to woodworking and using jigs for routing mortises and dowel holes.

2. Description of the Related Art

Connecting pieces of wood is accomplished by a number of techniques. Historically, tenon and mortise and/or dowel connections have been popular with woodworkers for strength and stability. A tenon is a projection on the end of the timber for insertion into a mortise. Tenons are usually taller than they are wide. There are several kinds of tenons, including: stub tenons, through tenons, and loose tenons. A mortise is a cavity cut into a piece of timber to receive a tenon. There are several types of mortises. A mortise may have only three sides in which case there is neither a backside nor a top side (i.e., open mortise). Similarly, a mortise may have four sides: a top, a bottom, and two sides with an opening on the back end (i.e., through-mortise). Of course, there is the traditional "blind mortise": a complete cavity in which no parts of the tenon are seen when the tenon enters the mortise.

In the past, tenons were made by chiseling away excess wood from the timber so that a tenon protruded from the original piece. Similarly, a mortise was created by chiseling out a hole from a second piece of wood for the tenon to fit into. With improvements in technology, routers allowed for efficient, accurate and timely cuts of tenons and mortises. These problems still exist, however, and are exacerbated when the woodworker wants to cut a large quantity of tenons and mortises, while ensuring consistent cuts. To assist woodworkers with consistency, jigs have become quite popular. A jig typically holds a piece of timber in place, while assisting the woodworker with the desired cut. At this time, there are very few jigs commercially available for efficiently cutting multiple mortises or dowels. With most available jigs, a woodworker needs ten minutes or more per mortise or tenon. The woodworker exerts a great deal of time resetting and realigning their timber in between cuts. The present invention, however, reduces the necessary time between cuts; increases consistency; and improves user experience.

BRIEF SUMMARY OF THE INVENTION

The claimed invention differs from what currently exists. Prior to this invention, woodworkers using other jigs available on the market could cut mortises but did not necessarily make the same cuts as easily from mortise to mortise: a problem that often arises when two mortises are connected via a loose tenon. Often, woodworkers desire the connected pieces of timber to have at least one flush surface. Because few jigs allow for consistent cuts, a flush surface is difficult to obtain. Consequently, woodworkers are required to exert an unnecessarily added level of scrutiny and diligence ensuring consistency while using the present invention, a woodworker can make a series of repeated cuts quickly and consistently. Until a woodworker acquires near "expert skills" over many failed attempts over a long period of time, the ability to cut consistent mortises is a haphazard process that results in failed connections.

The present invention is a mortise and dowel hole jig for ensuring timely and consistent cuts with a plunge router. The jig mounts to a work table and includes slot(s) to confine the router bit while cutting horizontally and holding the router in place vertically by two router guides. The jig also includes a rear clamp to lock-in-place and serve as a face for one or more pieces of wood; front clamp(s) to secure each piece of wood while making cuts; and a centering tool that enables a woodworker to quickly line up the center point of the piece of wood and determine where to make the desired cut.

The unique centering tool, in particular, enables a woodworker to quickly line up the center point of the piece of wood and determine where to make the cut. Additionally, the clamping mechanism allows the woodworkers to lock one of the clamps in place for all cuts current and subsequent, and adjust clamps on the other side to allow for pieces of wood to be interchanged as necessary in between cuts.

The present invention reduces the effort and skills needed to cut the precise length and depth of mortises needed for a successful mortise-tenon connection. The reduced effort results in more successful mortise-tenon connections; less attempts to create connections; improved quality and appearance of the pieces of wood; and significantly less time necessary to cut mortises.

DETAILED DESCRIPTION OF THE INVENTION

Figure 1A:
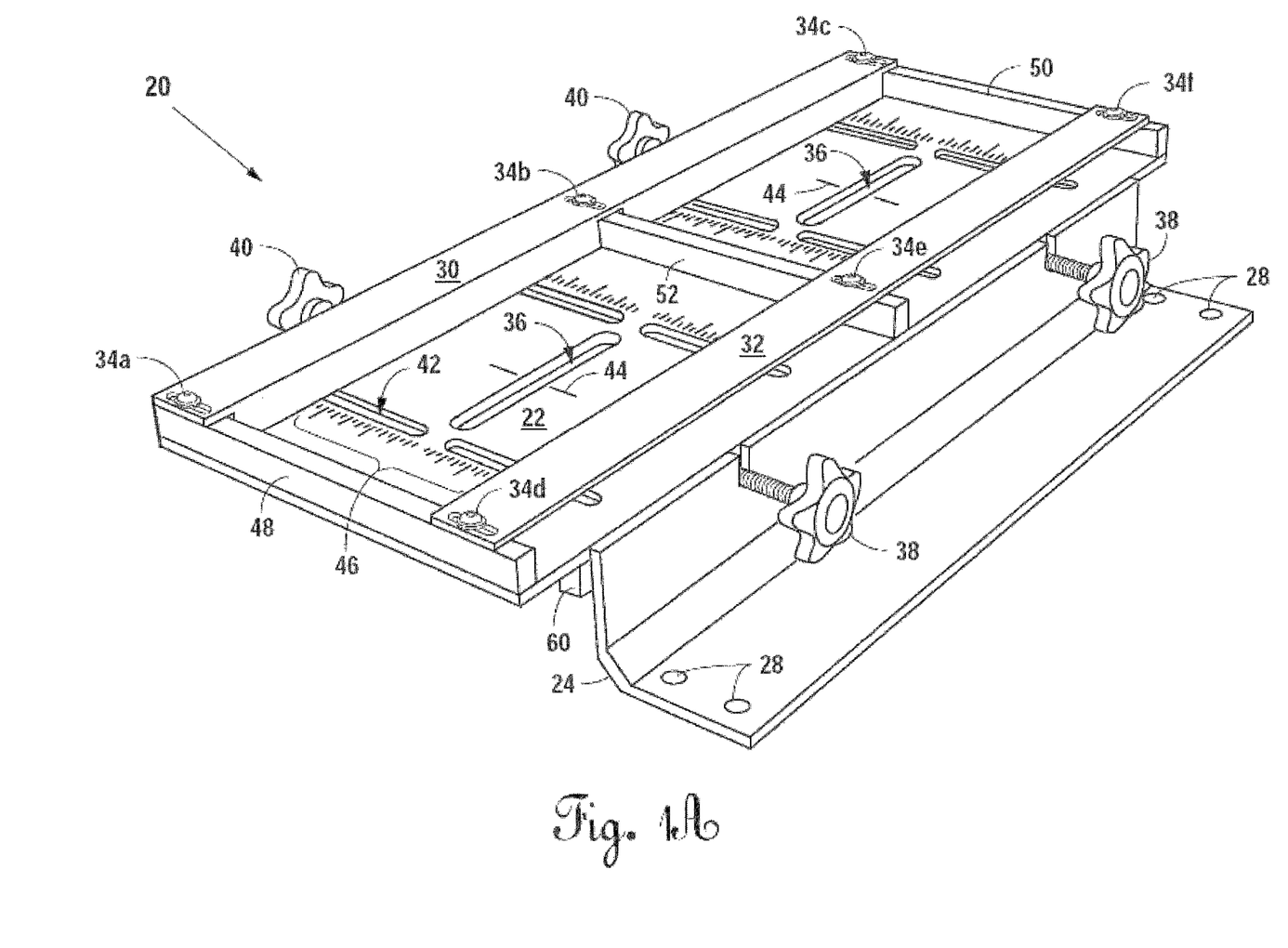
FIG. 1A is a top, front, and right side isometric view of a first embodiment of the present invention.

The embodiment of FIG. 1A illustrates a jig 20 comprising multiple attributes/elements. The jig 20 comprises a working surface 22 having a number of cutouts and other pieces. Affixed to the working surface 22 is a mounting bracket 24. As illustrated in FIG. 1A, mounting bracket 24 is generally perpendicular to the working surface 22. In this particular embodiment, the mounting bracket 24 can be connected and attached to the working surface 22, such that the mounting bracket on one surface can rest just above a work station or a piece of plywood and secured in place with screws, nails, or other hardware or secured through one or more mounting bracket orifices 28. In this illustration, there are four mounting bracket orifices 28. This embodiment of the invention also has a rear router guide 30, and a front router guide 32. The rear router guide 30 and front router guide 32 may be adjusted. Being able to adjust the rear router guide 30 and the front router guide 32 is important for securing a router (not part of the present invention) when using the jig 20.

This particular embodiment of the invention comprises two router grooves 36 (also known as router orifices) that run horizontally with respect to the working surface 22. The router grooves 36 are longer than they are wide and of generally uniform width such that pieces of wood can be secured underneath the working surface 22 and the router above can cut out mortises from above the working surface 22. More specifically, the router, when in place, will start in one position along a router groove 36 and cut into the subject piece of wood below. To effectively hold the subject piece of wood in place, this embodiment of the invention comprises clamps (not illustrated in FIG. 1A) that can be loosened and tightened using front clamp adjusters 38 and rear clamp adjusters 40. In addition to adjusting the clamps using the front clamp adjusters 38 and rear clamp adjusters 40, the clamps (not illustrated in FIG. 1A) can glide and adjust along the clamp grooves 42. Next to each of the clamp grooves 42 are vertical center lines 44 and tic marks 46, which improve accuracy and precision when using the jig 20. In addition to the rear router guide 30 and the front router guide 32 for securing router in place vertically, the user may take advantage of the right router stop 48, left router stop 50, and/or the center router stop 52 and secure the router horizontally as it cuts the subject piece of wood. FIG. 1A also includes front clamp adjuster blocks 60 as discussed in greater detail below.

Figure 1B:
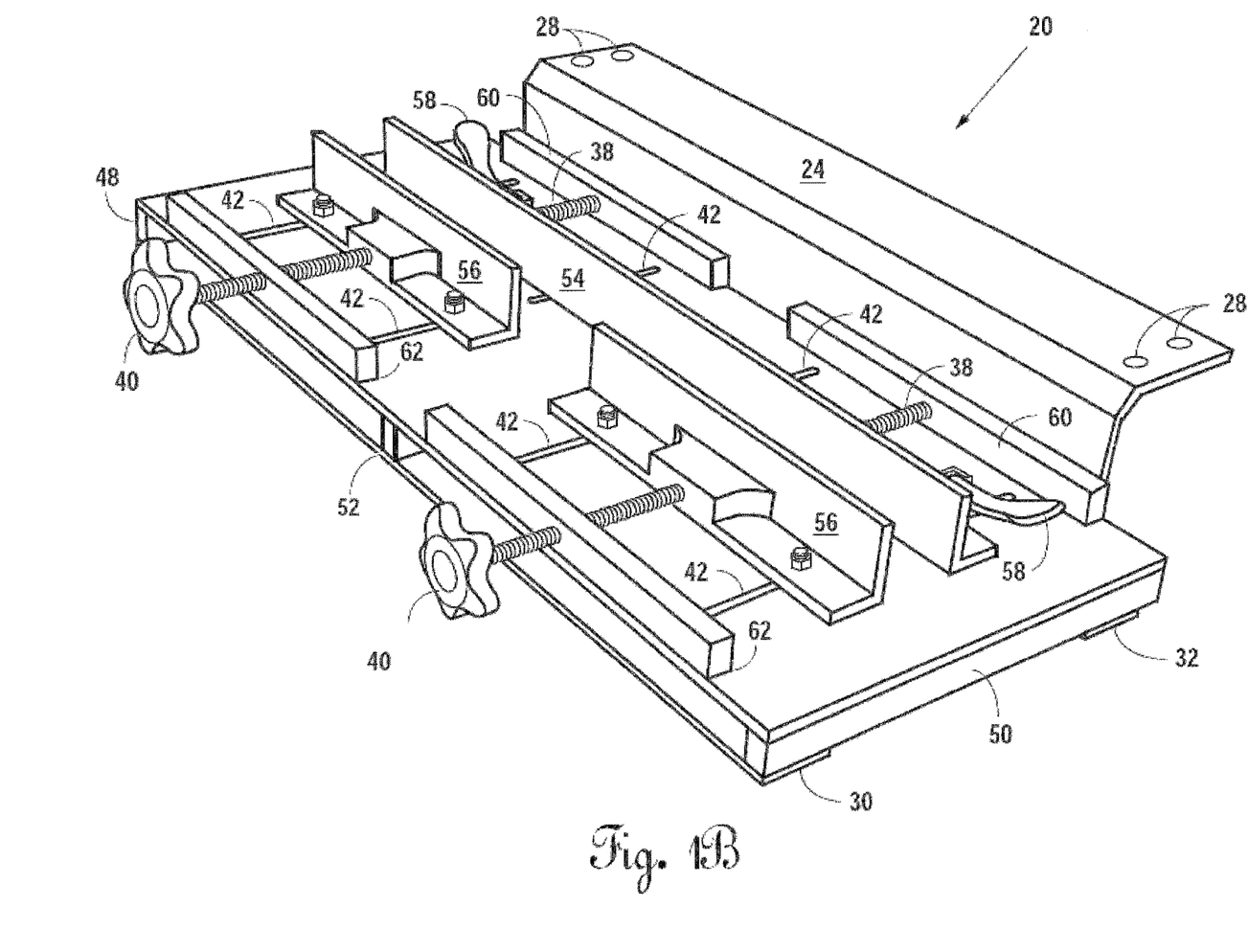
FIG. 1B is a bottom, left and rear side isometric view thereof.

FIG. 1B illustrates the embodiment of the invention depicted in FIG. 1A. FIG. 1B, however, offers a different perspective of this embodiment. The front clamp adjusters 38 assist or ultimately adjust the front clamp 54. The front clamp 54 is generally secured in place and maintained in that place for subsequent pieces of subject wood in order to maintain consistency between mortises when performing multiple cuts. The front clamp adjusters 38 protrude through front clamp adjuster blocks 60. As illustrated here, the front clamp adjuster blocks 60 are generally flush with the mounting bracket 24 and provide for further stability and structural integrity across the jig 20.

FIG. 1B further illustrates a pair of rear clamp adjusters 40 used to adjust a pair of rear clamps 56. The rear clamps 56 are used to loosen and tighten separate pieces of subject wood. While the front clamp 54 is generally set in place once determined, the rear clamps 56 may be tightened and loosened in between uses. Similar to the front clamp adjuster blocks 60, the rear clamp adjuster blocks 62 generally assist with holding the rear clamp adjusters 40 in place.

FIG. 1B also illustrates clamp groove hardware that can be used to further secure the front clamp 54 and rear clamps 56 in place. Although not illustrated in FIG. 1A or 1B, the clamp groove hardware 64, in some embodiments can pass through the front clamp 54, rear clamps 56 through the clamp grooves 42, allowing for an additionally secure position.

Figure 2:
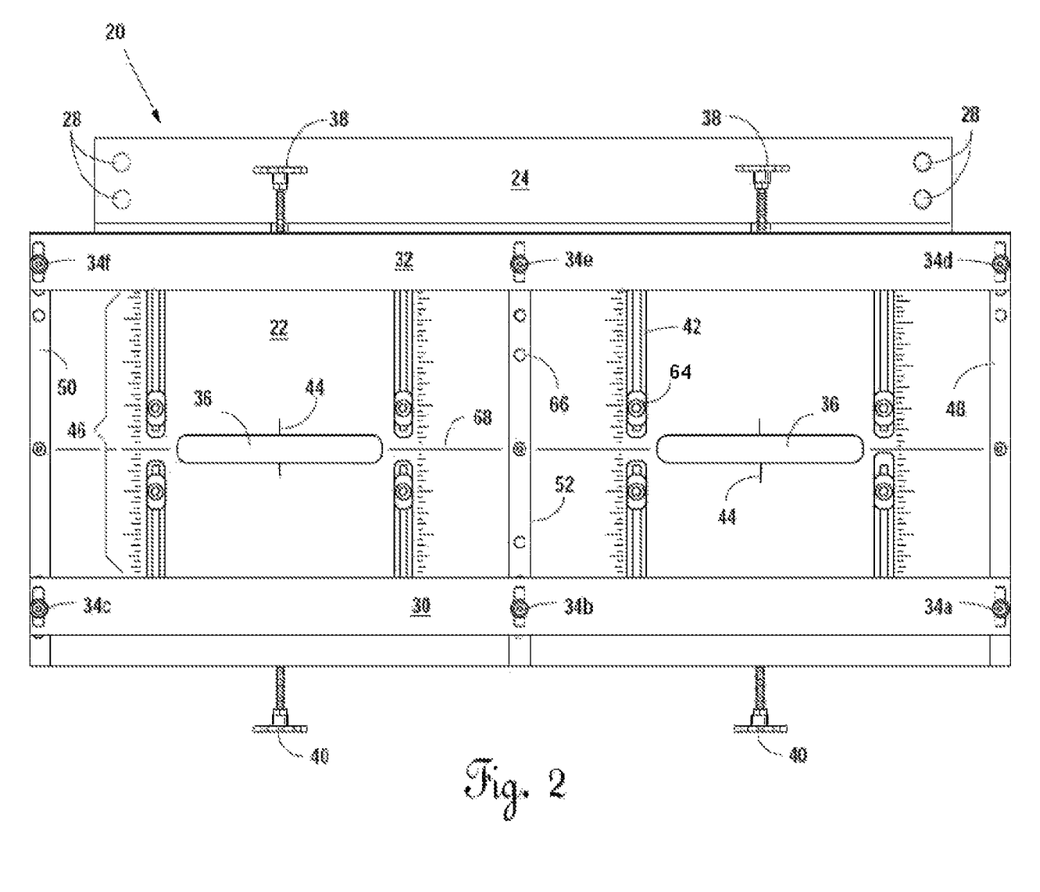
FIG. 2 is a top plan view of another embodiment of the invention.
Figure 3:
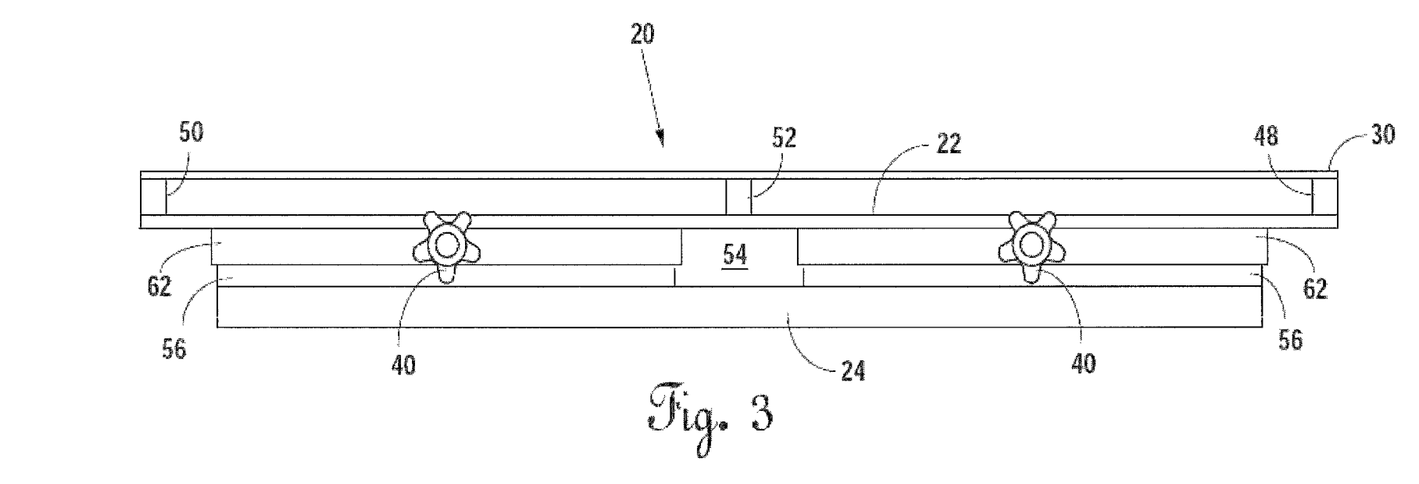
FIG. 3 is a rear plan view thereof.
Figure 4:
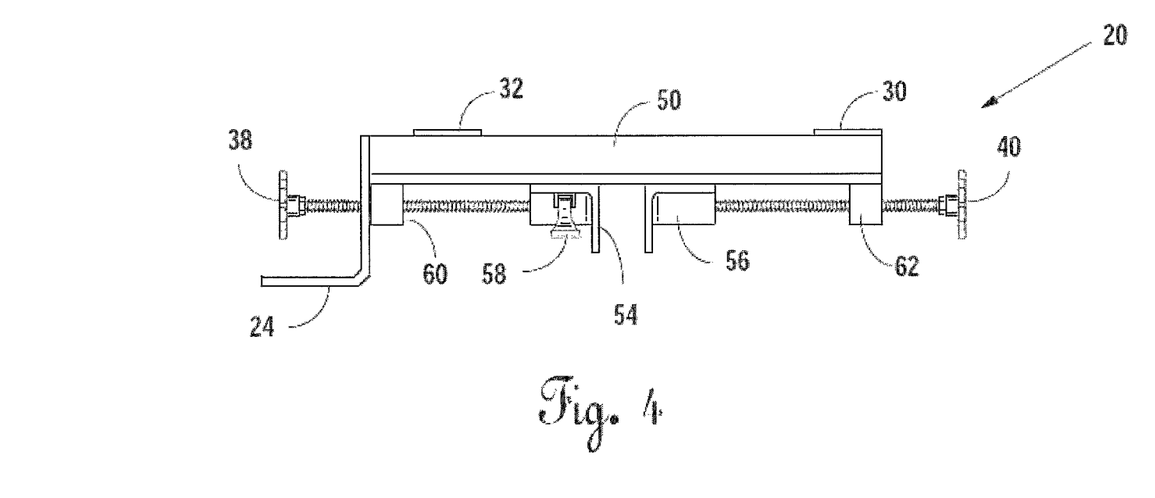
FIG. 4 is a left plan view thereof.

FIG. 2 illustrates a pan top view of an alternative embodiment of the present invention. This alternative embodiment comprises many of the similar characteristics and elements of the embodiment captured in FIGS. 1A and 1B. This alternative embodiment comprises nylon screws 66, however, positioned along the right router stop 48, left router stop 50, and a center router stop 52. The effectiveness of vertical center lines 44 will become more apparent as discussed below. FIG. 2 also illustrates clamp groove hardware 64 that extends through the clamp grooves 42 and further allowing the clamps to be positioned and secured in place. FIGS. 3 and 4 provide different views of the embodiment illustrated in FIG. 2.

Figure 5:
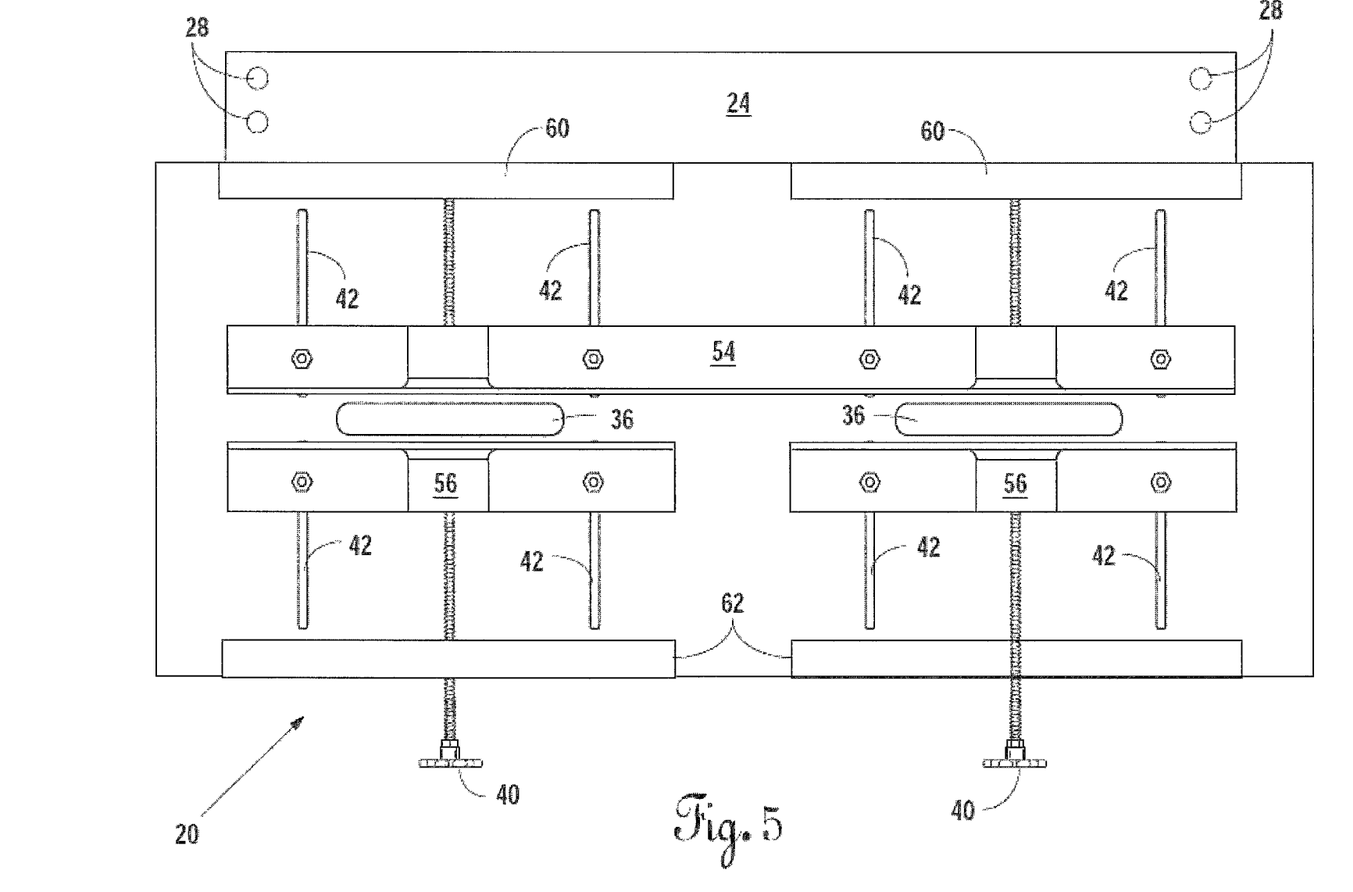
FIG. 5 is a bottom plan view thereof.

FIG. 5 offers a plan bottom view of the jig 20.

Figures 6, 7:
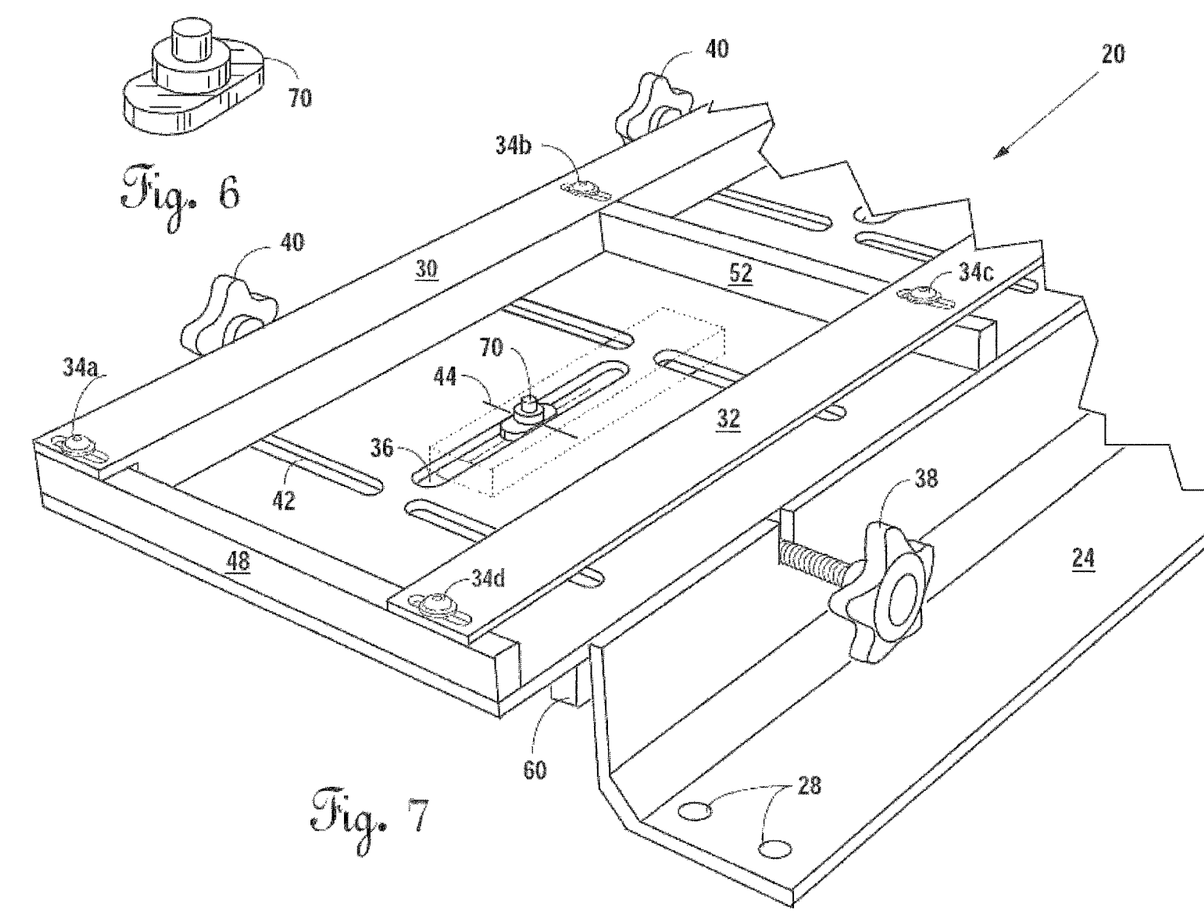
FIG. 6 is a top, front, and right side isometric view of an embodiment of the centering tool piece of the invention.
FIG. 7 is a top, front, and right side partial isometric view of a second embodiment of the invention with the centering tool piece of the invention positioned for use.

FIG. 6 illustrates the centering tool 70. The centering tool 70 may be used in conjunction with the vertical centering lines 44 to improve the accuracy and precision of the mortises when cut into the subject piece(s) of wood. More specifically, the user will have marked the desired centering lines along their subject piece of wood and would have secured it using the front clamp 54 and the rear clamps 56. And when the wood is secured generally in place, the user positions the centering tool above the piece of wood and adjusts the piece of wood (using gear clamps 56) such that the centering lines included along the centering tool line up with the centering lines of both the piece of wood and the vertical center lines 44. The centering tool 70 is of a shape generally consistent and slightly smaller than the router groove 36. The centering tool is generally shorter as it could glide from one end to the other of the router groove 36, but its width is consistent with that of the router groove 36. Stated differently, in this embodiment, the pair of parallel edges of the centering tool 70 abut the parallel edges of the interior wall of the router groove 36 (aka router orifice).

FIG. 7 illustrates the centering tool 70 when positioned along the vertical center lines 44 and within the router groove 36. FIG. 7 further illustrates how the centering cool 70 might appear in relation to a subject piece of wood (drawn in dashed lines) positioned beneath the working surface 22.

Once the piece of wood is lined up for precision and accuracy, the centering tool is removed from the router groove 36 and the drill bit and router are positioned above the piece of wood and the user may begin to make cuts.

Certain embodiments of the invention may be used in the following manner. In a commercial application, for instance, certain embodiments may be packaged such that the mounting bracket is not in a final position, but instead overlapping the working surface or the like. Looking to the mounting bracket, each of the four bolts should be removed. The mounting bracket should be rotated such that it is in a position to be mounted to a work station and it should be remounted using the four bolts previously removed. With the mounting bracket in its modified position, the four bolts should be tightened and secured in place. The bracket should be mounted to the work table. Alternatively, the jig may be mounted to a 2×4 or a 2×6 piece of wood. The 2×4 or 2×6 piece of wood could then be clamped to a work station when in use. In alternative embodiments, the jig may comprise an additional clamping mechanism so as to clamp the jig to a work table—rather than mount.

Once the invention is mounted to a work table using the mounting bracket, a plunge router is placed atop of the jig with the centering tool tightened within the router collet. The router is lined up such that the centering tool registers the router to the router slot. The north and south guides are tightened to hold the router in position. Using an Allen wrench of appropriate size, the series of screws located in the north router guide and the south router guide should be loosened slid to the outer most position available for the guides. Next, the north and south guides are slid to touch the edges of the router base. Using an Allen wrench, the guides should be tightened and held in position. When the guides have been tightened, the corresponding screws should also be tightened such that the guides are square. The router should be able to move freely east and west while remaining snug north and south. The step of placing the router in position and tightening the north and south guides is repeated both with the left slot as well as that on the right slot when registering the router to the jig.

After selecting a piece of wood, a woodworker should mark the wood with vertical lines (called "layout of a mortise"). Looking at the piece of wood for the desired mortise, the woodworker should mark a center vertical line, and a center horizontal line on the piece of wood for the desired cuts. The woodworkers should then mark lines for the desired end points of the mortise. Once marked, the piece of wood should be placed on the bottom end of the mortise jig between the front and rear clamps. After marking the wood, the wood may be secured by placing the piece of wood between the front and rear clamps under the jig. The piece of wood should be aligned such that the vertical center line of the piece of wood corresponds to the vertical center line of the jig.

Alternatively, the centering tool should be inserted into the collet of the router and tightened accordingly. The plunge router should be lowered onto the router bed of the jig such that the centering tool is aligned into the router bit slot. The router should be plunged down such that the centering tool fits firmly within the router bit slot and locked in that position. The centering tool should be placed into the router bit groove so that it rests on the piece of wood. The front and back adjusters should be turned in the same direction at the same time to move the piece of wood north or south until the exact center position is found, all the while making sure the both sides of the rear clamp is square with the router slot.

The front and back adjusters are tightened by turning them at the same time and in the same direction until a desired position is obtained. When the desired position is obtained and the rear clamps are square with the router slots, the rear clamp locks underneath the invention should be secured. By securing these rear clamp locks, a face side of the wood is established which ultimately allows for the repeated and consistent cuts from multiple mortises. Although the illustrated embodiment teaches extended lock bolts for keeping the rear clamp secure, alternative embodiments may include cam bolts or nuts that tighten with a wrench. Similarly radial bearing (to keep movements square) can be used instead of knobs moved with an air cylinder.

Once the piece of wood is properly centered, the centering tool should be removed from the router and replaced with the desired size router bit. After the centering tool is replaced with the desired size router bit, the router should be aligned to the left side, inside of the left mark of the piece of wood. This position on the wood will become the left doweling hole or left edge of the mortise.

In embodiments of the present invention comprising a plurality of slots, a woodworker may additionally clamp a piece of wood—not intended for cutting a mortise—into place such that the piece of wood serves as a stop so that all cuts will be in the same place without marking the center. At this point, a woodworker is ready to cut mortises using the mortise jig. One of ordinary skill in the art will recognize that the invention may be used on multiple thin pieces of wood for "stepping" to make multiple mortises. Additionally, the user may plunge dowel holes with the jig; or use the invention for edge gluing by using dowels or mortises.

This invention is often made of durable material, which may include metal, plastic, or wood. Metal can come from machined aluminum, aluminum weldment or castings, or similar steel or alloy. Molded or machine plastic can be used with recommended strengthening and stiffening features like ribs or other sectioning techniques. In a preferred embodiment, the parts may compose black anodized aluminum for the body, aluminum centering tool, aluminum clamps, and plastic clamp adjusters. The particular thickness and other dimensions of the materials are not particularly important, so long as the pieces are necessarily durable for the purpose of securing a router during mortise cuts.

The invention may include any number of nuts, bolts, and screws for securing the various router stops and the clamps, locks, or mounting brackets in place. The length and width of the jig itself and the corresponding router stops adjusters, brackets, and locks, and clamps may be of varying dimension. The user, however, will note that the dimensions must be of appropriate length to accommodate commercially available routers for creating mortises. Given the size of commercially available routers, the travel distance of the router bit is not anticipated to exceed five (5) inches and the largest bits are not anticipated to exceed one half (½) inch. These figures should not be considered limiting. For example, the slots could be made narrower, thinner, deeper, and/or wider for different size mortises.

Although particular embodiments of the invention herein have been described, it is not limited to this description. It is therefore to be understood that numerous modifications may be made to the embodiments without departing from the spirit and scope of the present invention.

For instance, the present invention as discussed above includes two router bit slots. The invention, however, may include one or any number of router bit slots. Also, the front clamps could be replaced with either a single clamp or a greater number of clamps, depending possibly on the number of router bit slots.

Similarly, the materials used can vary between embodiments. The invention has been generally described as various combinations of metal, plastic, or wood. One of ordinary skill in the art will recognize the possibility for additional variations such as the use of production via casting rather than traditional plates. The hardware used in the jig can comprise brass parts just as easily as nylon or other plastic parts. Those components of the invention that are metal may be anodized or non-anodized or further include Slick Tape™ or similar material. The use of Slick Tape™, or similar material, may prove especially useful for steady sliding of a router across an aluminum surface. The invention may come in any number of colors.

Additional features can be embodied with the centering tool for storage with the jig. For instance, the centering tool could be threaded and stored with a corresponding threaded piece of the jig. Alternatively, a storage compartment—slightly larger than the centering tool—with a door or slide out could be added to the jig so as to store the centering tool when not in use.

For commercial or industrialized applications, the invention could include pneumatic clamps and electronic moving parts—to further increase efficiency, as well as ease of use.

We claim:
1. A woodworking jig comprising:
a single plate having a first side and a second side opposite the first side;
a rear router guide along part of the first side of the single plate;
a front router guide along part of the first side of the single plate;
one or more router orifices within the single plate;

a front clamp adjustable along part of the second side of the single plate;

a rear clamp adjustable along part of the second side of the single plate;

a first adjuster connected to the front clamp;

a second adjuster connected to rear clamp;

a first clamp adjuster block for securing the first adjuster to the single plate; and a second clamp adjuster block for securing the second adjuster to the single plate.

2. The woodworking jig of claim 1 further comprising one or more router stops along part of first side of the single plate.

3. The woodworking jig of claim 1 wherein the one or more router orifices comprise at least two orifices, and the front clamp is equidistant to each of the at least two orifices.

4. The woodworking jig of claim 1 further comprising a mounting bracket attached to the single plate.

5. The woodworking jig of claim 1 further comprising a second rear clamp, the one or more router orifices comprise at least two orifices, the rear clamp and the second clamp each opposite the at least two orifices from the front clamp, the rear clamp adjustably connected to the single plate and independent of the second rear clamp.

6. The woodworking jig of claim 1 further comprising a plurality of tick marks marked along the single plate.

7. The woodworking jig of claim 6 wherein plurality of tick marks are organized by a standard unit of measurement.

8. The woodworking jig of claim 1 wherein at least one of the one or more router orifices is an obround shape.

9. The woodworking jig of claim 1 wherein at least one of the one or more router orifices comprises a pair of interior facing parallel edges.

10. The woodworking jig of claim 1 further comprising one or more holes within the single plate.

11. The woodworking jig of claim 1 further comprising one or more grooves in the single plate wherein the front clamp has hardware capable of securing the front clamp in place along the one or more grooves.

12. A woodworking system comprising:
a jig comprising
a single plate having a first side and a second side opposite the first side;
a rear router guide along part of the first side of the single plate;
a front router guide along part of the first side of the single plate;
a router orifice within the single plate;
said router orifice having a length and a width;
a front clamp adjustable along part of the second side of the single plate;
a rear clamp adjustable along part of the second side of the single plate;
a centering tool configured to fit at least partially within the router orifice, the centering tool having a protrusion connected to an at least one base;
the protrusion perpendicularly connected to the at least one base; and said at least one base further comprising a width greater than the width of the protrusion and less than the width of the router orifice.

13. The woodworking system of claim 12 wherein the router orifice is an obround shape.

14. The woodworking system of claim 12 further comprising:
a first adjuster connected to the front clamp; and
a second adjuster connected to rear clamp.

15. The woodworking system of claim 14 further comprising:
a first clamp adjuster block for securing the first adjuster to the single plate; and
a second clamp adjuster block for securing the second adjuster to the single plate.

16. The woodworking system of claim 12 further comprising one or more router stops along part of first side of the single plate.

17. The woodworking system of claim 12 further comprising one or more holes within the single plate.

18. A woodworking system comprising:
a jig comprising
a single plate having a first side and a second side opposite the first side;
a rear router guide along part of the first side of the single plate;
a front router guide along part of the first side of the single plate;
a router orifice within the single plate;
said router orifice having a length and a width;
a front clamp adjustable along part of the second side of the single plate;
a rear clamp adjustable along part of the second side of the single plate;
a centering tool configured to fit at least partially within the router orifice, the centering tool having a protrusion connected to an at least one base;
the centering tool comprises a pair of parallel edges;
the router orifice comprises a pair of interior facing parallel edges; and
the parallel edges of the centering tool abut the parallel edges of the router orifice.

19. The woodworking system of claim 18 further comprising:
a first adjuster connected to the front clamp; and
a second adjuster connected to rear clamp.

20. The woodworking system of claim 19 further comprising:
a first clamp adjuster block for securing the first adjuster to the single plate; and
a second clamp adjuster block for securing the second adjuster to the single plate.

21. The woodworking system of claim 18 wherein:
the protrusion perpendicularly connected to the at least one base; and
said at least one base further comprising a width greater than the width of the protrusion and less than the width of the router orifice.

\* \* \* \* \*